United States Patent
Byatt et al.

(10) Patent No.: US 6,405,590 B1
(45) Date of Patent: Jun. 18, 2002

(54) CAPACITIVE FILLING-LEVEL SENSOR WITH DIELECTRIC COATING

(75) Inventors: John Anthony Byatt, Klingnau; Elias Jülke, Wettingen; Thomas Kleiner, Nussbaumen; Daniel Matter, Brugg; Philippe Prêtre, Baden-Dättwil, all of (CH)

(73) Assignee: ABB Research Ltd., Zurich (CH)

( * ) Notice: Subject to any disclaimer, the term of this patent is extended or adjusted under 35 U.S.C. 154(b) by 0 days.

(21) Appl. No.: 09/638,004

(22) Filed: Aug. 14, 2000

(30) Foreign Application Priority Data

Aug. 12, 1999 (DE) .......................................... 199 38 270

(51) Int. Cl.$^7$ .............................................. G01F 23/00
(52) U.S. Cl. .................................................. 73/304 C
(58) Field of Search ........................... 73/304 C, 61.41, 73/61.43, 61.44

(56) References Cited

U.S. PATENT DOCUMENTS

| | | | | |
|---|---|---|---|---|
| 4,301,681 A | * | 11/1981 | Maltby et al. ............. | 73/304 C |
| 5,125,265 A | * | 6/1992 | O'Connell ................. | 73/61.41 |
| 5,669,263 A | | 9/1997 | Borchers et al. | |
| 5,722,290 A | * | 3/1998 | Kronberg ................... | 73/304 C |
| 6,073,488 A | * | 6/2000 | Byatt et al. ............... | 73/304 C |

* cited by examiner

*Primary Examiner*—Hezron Williams
*Assistant Examiner*—Katina Wilson
(74) *Attorney, Agent, or Firm*—Burns, Doane, Swecker & Mathis, L.L.P.

(57) ABSTRACT

The present invention discloses a capacitive filling-level sensor, which is suitable in particular for filling-level determination in oil separator tanks. The capacitive sensor includes a measuring probe with at least one sensor electrode. According to the invention, the measuring probe is at least partially sheathed with at least one outer layer of a fluorinated plastic and at least one inner layer of a mica-filled plastic. Important exemplary embodiments concern an outer layer of perfluoroethylene-perfluoropropylene copolymer (FEP), an inner layer of mica-coated glass fiber tape impregnated with epoxy resin and possibly silanized and an incompressible, thermally adapted filling of the measuring-probe pipe with silicone oil and glass spheres or glass polyhedrons and/or an inner rod of AlMgSi-filled epoxy resin. The sheathing is electrically insulating, chemically inert, hydrophobic, oleophobic, waterproof, mechanically robust and easy to produce.

14 Claims, 3 Drawing Sheets

CAPACITIVE FILLING-LEVEL SENSOR WITH DIELECTRIC COATING

FIELD OF THE INVENTION

The present invention relates to the field of filling level indicators. It is based on a device and a method for filling level measurement.

BACKGROUND OF THE INVENTION.

In offshore oil production, separation tanks in which the phases occurring (sand, water, oil and gas) are separated by segregation and are carried away in separate line systems are used. For controlling the outlet valves, the filling levels, in particular the positions of the boundary layers between oil and water, are monitored.

High-pressure separation tanks designed for operation on the ocean bed, several 100 m below the surface of the ocean, have recently been developed. They allow the oil firstly to be separated and then to be pumped to the surface of the ocean with little expenditure of energy. Such separator tanks are subjected to very high pressures of 60 bar–180 bar and high temperatures of 50° C.–120° C. A filling-level measuring system must operate under such difficult conditions reliably and without maintenance for many years in order to ensure the operational safety of the separator tank.

Capacitive filling-level sensors which are immersed into the filled product and detect the filling level by changes in the dielectric constant and/or conductivity of the filled product are state of the art. A variety of electrode arrangements are known here. For example, in the German patent application with the application number DE 197 13 267.7 a rod-shaped closed measuring probe with a plurality of ring electrodes arranged along its probe axis is used.

A major problem when using capacitive filling-level sensors in separator tanks is that oil and oil constituents as well as process water and salt water represent a chemically highly aggressive and corrosive environment for the measuring probe and in particular for the electrodes. Materials which are potentially suitable for dielectric shielding, such as glass or ceramic, can, however, only be produced in the desired form with difficulty or with great expenditure.

SUMMARY OF THE INVENTION

It is the object of the invention to specify an improved dielectric protective coating which is stable over a long period of time and can be easily produced for a capacitive filling-level sensor.

According to the invention, the measuring probe of a capacitive filling-level sensor with at least one sensor electrode is protected by the measuring probe being sheathed at least partially by at least one outer layer of a fluorinated plastic and at least one inner layer of a mica-containing plastic. The combination of the fluorinated protective coating with the mica-filled protective coating has the effect of creating a chemically resistant and mechanically robust dielectric covering with a stable, small dielectric constant. The protective coating can be produced in small thicknesses (a few mm) and is suitable in particular for coating elongate measuring probes. The fluorinated plastic makes the outer layer hydrophobic and oleophobic. As a result, the adherence of water and/or oil residues on the measuring probe is reduced or eliminated and the reliability of the capacitance measurement is improved. The inner layer represents an additional diffusion barrier, especially to penetrating water. As a result, the constancy of the dielectric constant of the coating is ensured even when there is exposure to water over many years.

In a first exemplary embodiment, the outer layer consists of a thermoplastic material, such as for example perfluoroethylene-perfluoropropylene copolymer (FEP). On account of the thermoplasticity, the outer layer can be shrunk or extruded onto the measuring probe in a simple way.

In another exemplary embodiment, the inner layer consists of mica-coated glass fiber tape impregnated with epoxy resin and possibly silanized. This achieves particularly good water resistance. The tape form ensures that the inner coating is easy to produce by winding in one or more plies.

In a further exemplary embodiment, the measuring probe comprises a GRP pipe, which contains inside it glass spheres or polyhedrons and/or an inner rod of AlMgSi-filled epoxy resin and/or oil (for example mineral oil or silicone oil). The filling is suitable for high pressures, since it is largely incompressible and is thermally adapted to the GRP pipe.

BRIEF DESCRIPTION OF THE DRAWINGS

Preferred embodiments of the invention are disclosed in the following description and illustrated in the accompanying drawings, in which.

In the figures, the same parts are provided with the same reference numerals.

DETAILED DESCRIPTION OF THE INVENTION

Figure 1:
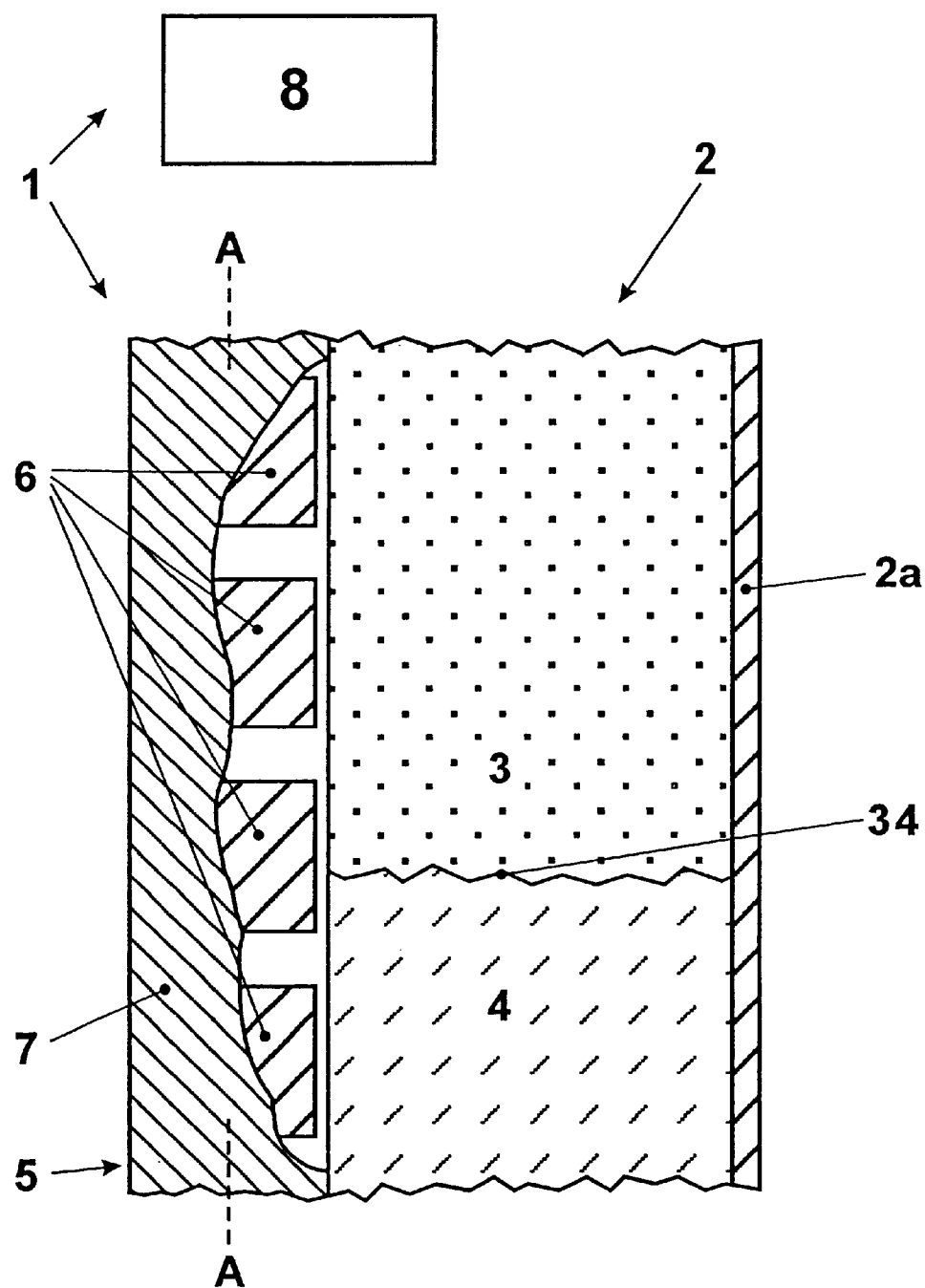
FIG. 1 shows a capacitive filling-level sensor with a multi-electrode measuring probe and dielectric shielding in an oil separator tank.

According to FIGS. 1–4, the invention has as its subject-matter a capacitive filling-level sensor 1, which is suitable in particular for determining the location of a boundary layer 34 between water 3 and oil 4 in a separator tank 2. The filling-level sensor 1 comprises a measuring probe 5 and measuring electronics 8. The measuring probe 5 has an electrode or an electrode arrangement 6 with an electrically insulating covering 7, which provides at least partially coverage and according to the invention has at least one outer layer 7a of a fluorinated plastic and at least one inner layer 7b of a mica-filled plastic. Altogether, the dielectric covering is to have a thickness of approximately 1–3 mm and a small dielectric constant of between 2 and 7, in order to keep the influence on the capacitance measuring signals small. Exemplary embodiments are specified below.

Figure 2:
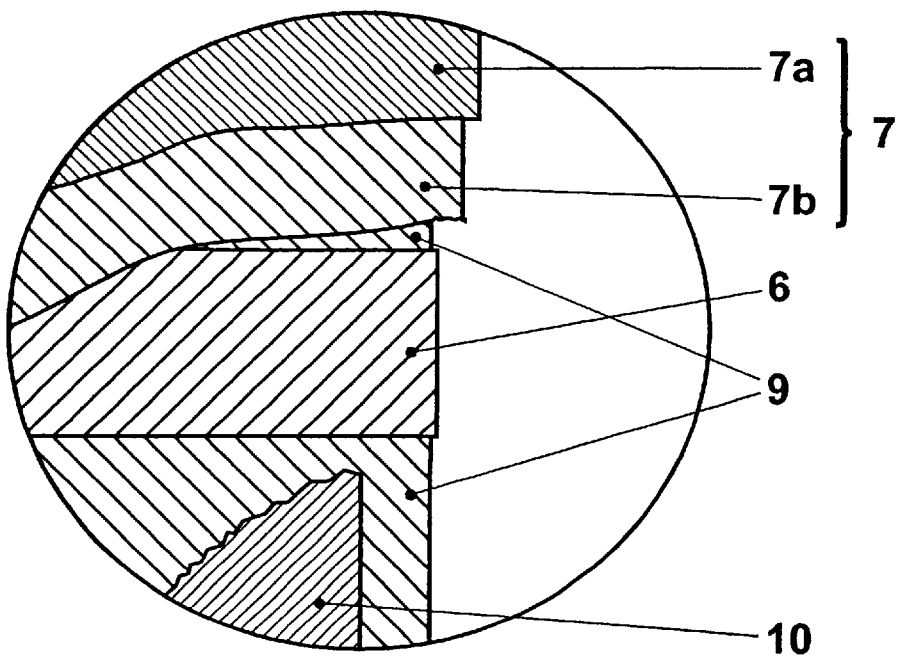
FIG. 2 shows a two-layer construction according to the invention of the dielectric shielding (representation cut open layer by layer)

The outer layer 7a according to FIG. 2 preferably consists of a thermoplastic material which is shrunk or extruded onto the measuring probe 5. In particular, the outer layer 7a consists of a perfluoroethylene-perfluoropropylene copolymer (=tetrafluoroethylene-hexafluoropropylene copolymer, FEP).

Figure 3:
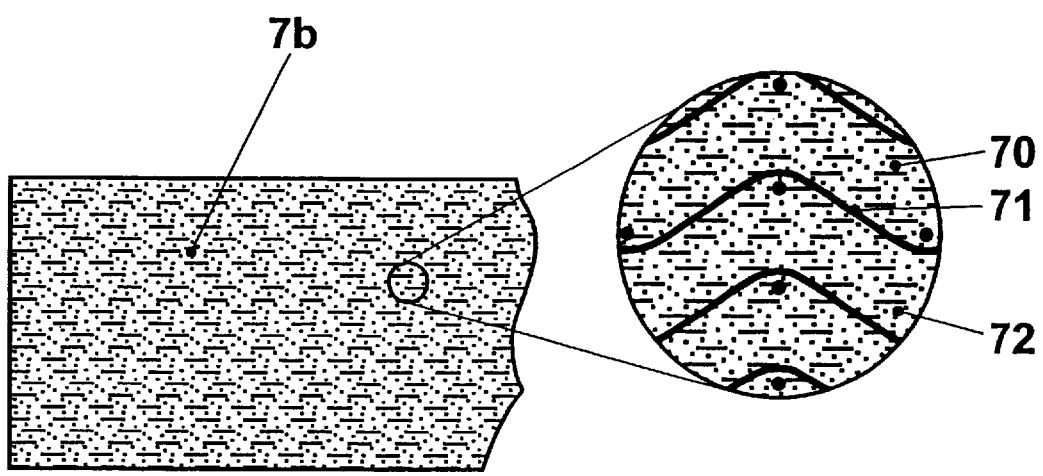
FIG. 3 shows a construction according to the invention of the inner layer of the dielectric shielding.

FIG. 3 shows a preferred construction of the inner layer 7b. To improve the mechanical properties, the inner layer 7b has a glass fiber reinforcement. The glass fiber reinforcement also brings about an improved alignment of the mica platelets parallel to the surface of the measuring probe 5 and consequently an elongation of the diffusion paths for penetrating water perpendicular to the surface. In particular, the inner layer 7b contains 15%–20% glass fiber 71, 50%–60% mica paper 70 and 20%–35% epoxy resin 72. Mica papers 70 can be produced by the Romica or Samica method. Samica papers 70 are particularly suitable as barriers with the greatest possible diffusion resistance and because of the better dielectric properties. They can be used as windable tapes based on glass fabric (mica paper adhesively attached on glass fabric) or glass fabric free (mica paper impregnated with epoxy resin and laminated in a number of layers). The water resistance of the inner layer 7b can, furthermore, be improved thereby, [sic] the [sic] a cycloaliphatic epoxy resin with anhydrous hardener is used as the epoxy resin 72.

The inner layer 7b is advantageously constructed from a mica-coated glass fiber tape which is wound up onto the measuring probe 5 in one or more plies. The inner layer 7b is impregnated with the epoxy resin 72, preferably vacuum-cast or die-cast, and hardened. Moreover, the inner layer 7b may be silanized from the outside (not shown). This prevents a rise in the surface conductivity being caused by the formation of monomolecular films of water. Alternatively or additionally, a layer of oil may be introduced between the inner layer 7b and outer layer 7a in order to drive out residual water and residual moisture.

Figure 4:
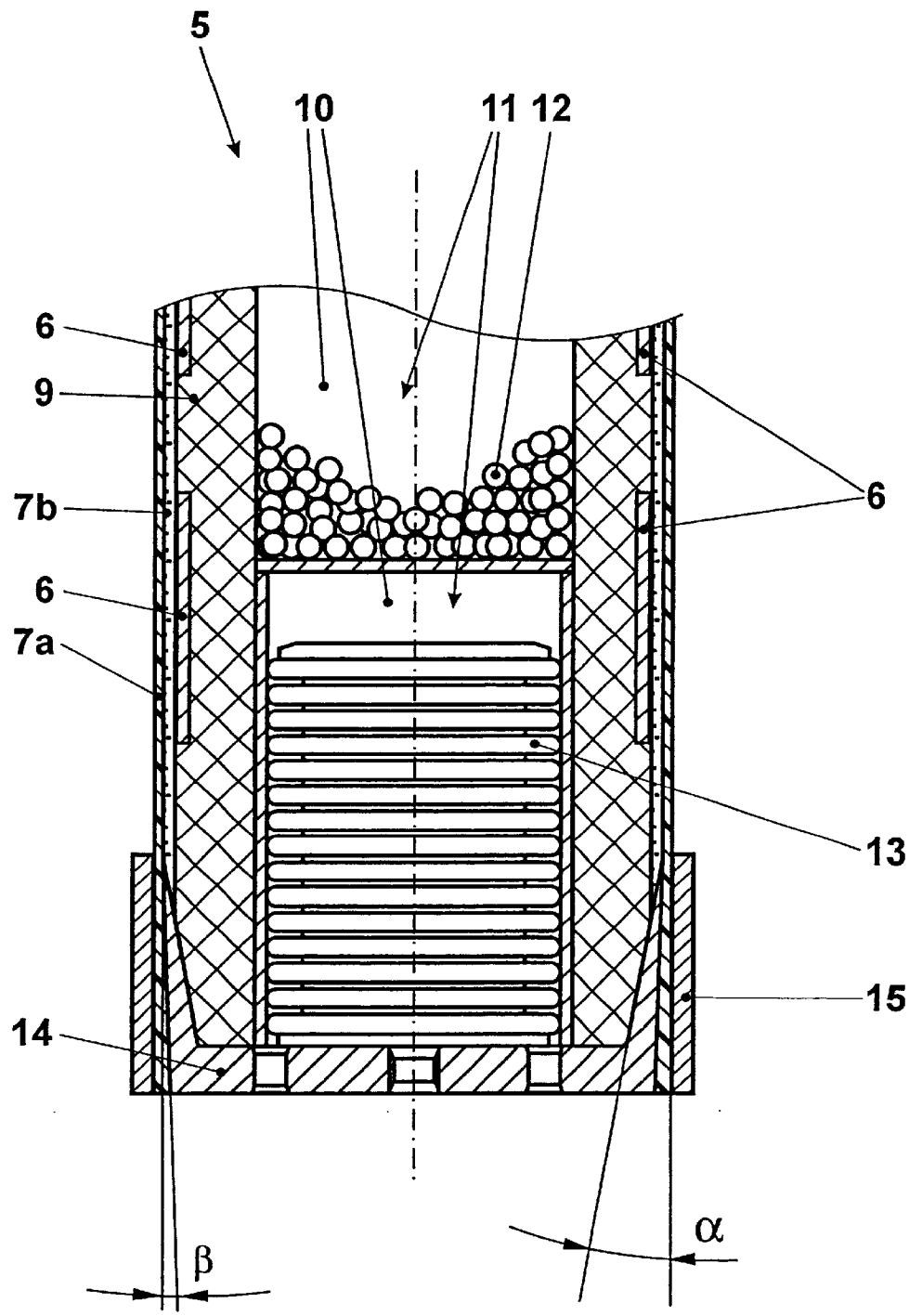
FIG. 4 shows a cross section through a measuring probe end designed according to the invention.

The further construction of the measuring probe 5 can be seen from FIG. 4. The measuring probe 5 comprises a GRP pipe 9 with externally applied electrodes 6 and with an inner pressure-equalizing volume 10, which is filled with spheres or polyhedrons 12 and/or an inner rod (not shown), preferably of AlMgSi-filled epoxy resin or a glass ceramic (for example Macor from Corning Inc.), and/or oil (for example mineral oil or silicone oil) 11. The incompressible filling, supplemented by oil 11, allows an internal pressure compensating for the external pressure to be built up and the penetration of moisture to be prevented or retarded. The filling is in this case designed in such a way that its coefficient of thermal expansion is as close as possible to that of the GRP pipe 9. In addition, a bellows 13 may be fitted on the end of the GRP pipe 9 for pressure equalization.

The spheres or polyhedrons 12 serve for reducing the oil volume 11 (great thermal expansion). The degree of filling is 74% by volume in the case of spheres and up to 100% by volume in the case of cubes or other spacefilling Archimedian bodies. They may be predominantly of the same size (for example several mm in diameter). For the filling of interstices, smaller spheres or polyhedrons 12 (for example 0.1 mm in diameter) may be present, it being necessary to ensure homogeneous mixing during filling. Spheres or polyhedrons 12 of different diameter may be marked by different colors. In the case of polyhedrons 12, in particular cubes 12, the corners may be rounded off by drum polishing. The polyhedrons 12 are capable of being produced from glass melt by the pressed glass method or from porcelain or ceramic by the pressure sintering method. They preferably consist of electrically insulating glasses or moisture-absorbing materials such as molecular sieve, fuller's earth, activated alumina or silica gel.

For sealing the end of the GRP pipe 9, a form-fitting cap 14 is possibly placed onto the GRP pipe 9 and the inner layer 7b, the sheathing provided by the outer layer 7a also sheathing the cap 14. In addition, a metal ring 15 may be placed onto the sheathed cap 14. This end construction has the effect of preventing the penetration of water through capillary forces. Moreover, the outer layer 7a is fixed from the outside.

The cap 14 advantageously has a conical interior angle $\alpha$ and a conical exterior angle $\beta$ and the GRP pipe 9 is conically tapered at the end on the outside at the angle $\alpha$. The metal ring 15 may be conically tapered on the inside at the angle $\beta$. The angles are, for example, of the order of magnitude of $\alpha$ approximately 5° and $\beta$ approximately 0.60°. The cap 14 is preferably adhesively attached and the metal ring 15 is preferably shrunk on. The conical design achieves the effect of an optimum fit of the cap 14 and of the metal ring 15.

In the exemplary embodiment according to FIG. 1, the measuring probe 5 is rod-shaped and has electrodes 6 arranged along a probe axis A. Alternatively or additionally, a counter electrode for the rod-shaped measuring probe 5 may be provided by a container wall 2a or a preferably elongate auxiliary electrode. To eliminate the falsification of capacitance signals by insulating films of dirt, the electrodes 6 may have different thicknesses of the covering 7. For example, electrodes 6 adjacent one another have different thicknesses and non-adjacent electrodes 6 have the same thickness of the covering 7. This may be realized by setting back electrodes 6 and/or by additional plies of the inner layer 7b on certain electrodes 6 or in some other way.

Altogether, the dielectric covering 7 is to have a thickness of approximately 1–3 mm and a dielectric constant of between 2 and 7, in order to keep the influence of the covering 7 on the capacitance measuring signals small.

Furthermore, the invention has as its subject-matter a method for filling-level measurement with the capacitive filling-level sensor 1 described above. In this method, a vertical profile of the dielectric constant and/or of the electrical conductivity of the filled product 3, 4 is measured with the capacitance sensor 1, comprising a measuring probe 5 and measuring electronics 8, and the position of at least one boundary layer 34 is determined from the profile.

Although this invention has been illustrated and described in accordance with certain preferred embodiments, it is recognized that the scope of this invention is to be determined by the following claims.

What is claimed is:

1. A capacitive filling-level sensor, useful for determining a location of a boundary layer between water and oil in a separator tank, comprising:

a measuring probe with an electrode, the measuring probe being provided at least partially with an electrically insulating covering, wherein the covering comprises at least one outer layer of a fluorinated plastic and at least one inner layer of a mica-containing plastic.

2. The capacitive filling-level sensor as claimed in claim 1, wherein a) the outer layer is a thermoplastic material which is shrunk or extruded onto the measuring probe, and b) the outer layer comprises a perfluoroethylene-perfluoropropylene copolymer.

3. The capacitive filling-level sensor as claimed in claim 1, wherein a) the inner layer contains a glass fiber reinforcement, b) the inner layer contains 15%–20% glass fiber, 50%–60% mica paper and 20%–35% epoxy resin, and c) the epoxy resin is an anhydrously hardened cycloaliphatic epoxy resin.

4. The capacitive filling-level sensor as claimed in claim 1, wherein a) the inner layer comprises a mica-coated glass fiber tape which is wound up onto the measuring probe in at least one ply, b) the inner layer is impregnated with epoxy resin and hardened, and c) the inner layer is silanized from the outside.

5. The capacitive filling-level sensor as claimed in claim 4, wherein the inner layer is die cast.

6. The capacitive filling-level sensor as claimed in claim 4, wherein the inner layer is vacuum-cast.

7. The capacitive filling-level sensor as claimed in claim 1, wherein a) the measuring probe comprises a GRP pipe with externally applied electrodes and an internal pressure-equalizing volume, b) the pressure-equalizing volume comprises spheres/polyhedrons, an inner rod, and oil, or mixtures thereof, and c) a bellows fitted on the end of the GRP pipe.

8. The capacitive filling-level sensor as claimed in claim 7, wherein a) the spheres/polyhedrons comprise glass, molecular sieve, fuller's earth, activated alumina or silica gel which are predominantly of the same size, b) smaller spheres for filling interstices, and c) oil-resistant Archimedean filling bodies suitable for a high degree of volume filling.

9. The capacitive filling-level sensor as claimed in claim 7, wherein the inner rod comprises AlMgSi-filled epoxy resin.

10. The capacitive filling-level sensor as claimed in claim 7, wherein the inner rod comprises glass ceramic.

11. The capacitive filling-level sensor as claimed in claim 7, wherein a) a form-fitting cap for sealing is placed onto the end of the GRP pipe and the inner layer, b) the outer layer sheathing covers the cap, and c) wherein a metal ring is placed onto the sheathed cap.

12. The capacitive filling-level sensor as claimed in claim 11, wherein a) the cap has a conical interior angle $\alpha$ and a conical exterior angle $\beta$, b) the GRP pipe end is conically tapered on the outside to approximately the angle $\alpha$, c) the metal ring is conically tapered on the inside to approximately the angle $\beta$, and d) the cap is adhesively attached and the metal ring is shrink-fitted.

13. The capacitive filling-level sensor as claimed in claim 1, wherein a) the measuring probe is rod-shaped and has electrodes arranged along a probe axis, and b) the electrodes comprise different thicknesses of the covering.

14. A method for filling-level measurement with a capacitive filling-level sensor as claimed in claim 1, comprising the steps of:

a) measuring a vertical profile of the dielectric constant and/or of the electrical conductivity of the filled product with the capacitance sensor, and b) determining the position of at least one boundary layer from the profile.

* * * * *